United States Patent
Takahashi et al.

(10) Patent No.: US 7,959,854 B2
(45) Date of Patent: Jun. 14, 2011

(54) HEAT RESISTANT ALLOY ADAPTED TO PRECIPITATE FINE TI-NB-CR CARBIDE OR TI-NB-ZR-CR CARBIDE

(75) Inventors: Makoto Takahashi, Hirakata (JP);
Kunihide Hashimoto, Hirakata (JP);
Makoto Hineno, Kobe (JP)

(73) Assignee: Kubota Corporation, Osaka-shi (JP)

( * ) Notice: Subject to any disclaimer, the term of this patent is extended or adjusted under 35 U.S.C. 154(b) by 466 days.

(21) Appl. No.: 12/092,181

(22) PCT Filed: Oct. 30, 2006

(86) PCT No.: PCT/JP2006/322064
§ 371 (c)(1),
(2), (4) Date: Apr. 30, 2008

(87) PCT Pub. No.: WO2007/052782
PCT Pub. Date: May 10, 2007

(65) Prior Publication Data
US 2009/0098319 A1    Apr. 16, 2009

(30) Foreign Application Priority Data

Oct. 31, 2005   (JP) ................................. 2005-315669

(51) Int. Cl.
*C22C 38/48* (2006.01)
*C22C 38/50* (2006.01)

(52) U.S. Cl. ................ 420/54; 420/47; 420/48; 420/51; 420/53; 420/55; 420/584.1; 420/586.1; 420/451; 420/452; 420/453

(58) Field of Classification Search .............. 420/47, 420/48, 51–55, 584.1, 586.1, 451–453; 148/327, 148/326, 410, 419, 909
See application file for complete search history.

(56) References Cited

U.S. PATENT DOCUMENTS
4,077,801 A   3/1978  Heyer et al.
(Continued)

FOREIGN PATENT DOCUMENTS
CN    1095425 A    11/1994
(Continued)

OTHER PUBLICATIONS

International Preliminary Report on Patentability mailed May 6, 2008, issued in corresponding International Patent Application No. PCT/JP2006-322064 with Forms PCT/IB/338, PCT/IB/373, and PCT/ISA/237.

(Continued)

*Primary Examiner* — Deborah Yee
(74) *Attorney, Agent, or Firm* — Westerman, Hattori, Daniels & Adrian, LLP

(57) ABSTRACT

A heat resistant alloy comprising, in % by weight, over 0.6% to not more than 0.9% of C, up to 2.5% of Si, up to 3.0% of Mn, 20 to 28% of Cr, 8 to 55% of Ni, 0.01 to 0.8% of Ti and 0.05 to 1.5% of Nb, the balance being Fe and inevitable impurities, the value of (Ti+Nb)/C being 0.12 to 0.29 in atomic % ratio. When the alloy further contains up to 0.5% of Zr, the value of (Ti+Nb+Zr)/C is 0.12 to 0.29 in atomic % ratio. When the alloy is heated at a temperature of at least about 800 degrees C., a fine Ti—Nb—Cr carbide or Ti—Nb—Zr—Cr carbide precipitates within grains to thereby retard creep deformation and give an improved creep rupture strength. The alloy is therefore suitable as a material for hydrogen production reforming tubes.

26 Claims, 5 Drawing Sheets

U.S. PATENT DOCUMENTS

| | | | | |
|---|---|---|---|---|
| 5,019,331 | A | * 5/1991 | Yoshimoto et al. | 420/51 |
| 5,077,006 | A | * 12/1991 | Culling | 420/584.1 |
| 5,194,221 | A | * 3/1993 | Culling | 420/53 |
| 2003/0188808 | A1* | 10/2003 | Ueta et al. | 148/327 |

FOREIGN PATENT DOCUMENTS

| | | |
|---|---|---|
| EP | 391381 A1 | 10/1990 |
| EP | 1352983 A1 | 10/2003 |
| GB | 1544614 A | 4/1979 |
| JP | 52017311 A | 2/1977 |
| JP | 56-169755 A | 12/1981 |
| JP | 56169755 A | 12/1981 |
| JP | 5-230601 A | 9/1993 |
| JP | 05-239599 A | 9/1993 |
| JP | 5-239599 A | 9/1993 |
| JP | 06254666 A | 9/1994 |
| JP | 07-233446 A | 9/1995 |
| JP | 7-233446 A | 9/1995 |
| JP | 9-53154 A | 2/1997 |
| JP | 2001-247940 A | 9/2001 |
| RU | 2125110 C1 | 1/1999 |
| WO | 91/16467 A1 | 10/1991 |

OTHER PUBLICATIONS

International Search Report of PCT/JP2006/322064, date of mailing Jan. 30, 2007.

European Search Report dated Nov. 30, 2009, issued in corresponding European Patent Application No. 06832421.9.

* cited by examiner

×45,000

×90,000

×450,000

HEAT RESISTANT ALLOY ADAPTED TO PRECIPITATE FINE TI-NB-CR CARBIDE OR TI-NB-ZR-CR CARBIDE

TECHNICAL FIELD

The present invention relates to improvements in heat resistant alloys, and more particularly to heat resistant alloys adapted to precipitate a fine Ti—Nb—Cr carbide or Ti—Nb—Zr—Cr carbide when heated after casting and thereby given a high creep rupture strength and also to reforming tubes prepared from the heat resistant alloy for use in producing hydrogen.

BACKGROUND ART

Hydrogen production apparatus comprise a reforming furnace wherein a mixture of hydrocarbon and steam is introduced into reforming tubes to effect a reforming reaction with use of a catalyst for producing a hydrogen-rich reformed gas. The reforming reaction within the reforming tubes is conducted at a high temperature of about 800 to about 1000 degrees C. under a high pressure of about 10 to about 30 kgf/cm$^2$. This reaction is an endothermic reaction and therefore requires a large amount of fuel for heating the reforming tubes from outside.

Accordingly, improvements in heat efficiency to reduce the amount of fuel to be used serve to lower the running cost and also to diminish the $CO_2$ emission and are environmentally desirable.

The material for use in making reforming tubes needs to have a creep rupture strength capable of withstanding the foregoing conditions of high temperature and high pressure. If the material has a higher creep rupture strength, the reaction tube is improved in strength and thereby given a longer life, whereas the reforming tube can be decreased in wall thickness and therefore improved in heat efficiency, when to be made comparable to existing tubes in strength.

For use in making reforming tubes for hydrogen production, JP1993-230601A discloses a heat resistant alloy which contains, in % by weight, 0.1 to 0.6% of C, up to 3.0% of Si, up to 2.0% of Mn, 22 to 30% of Cr, 22 to 50% of Ni, 0.2 to 1.5% of Nb, 0.5 to 5.0% of W and 0.01 to 0.50% of Ti, the balance being Fe.

JP1982-40900B2 discloses a heat resistant alloy casting which contains, in % by weight, 0.25 to 0.8% of C, 8 to 62% of Ni, 12 to 32% of Cr, at least 0.05% to less than 2% of W, at least 0.05% to less than 1% of Ti, up to 3.5% of Si, up to 3% of Mn, up to 2% of Nb and up to 0.3% of N, the balance being Fe However, the hydrogen production reforming tubes prepared from these heat resistant alloys were not always satisfactory in creep rupture strength.

We have conducted intensive research and found that when a fine Ti—Nb—Cr carbide (or Ti—Nb—Zr—Cr carbide when Zr is also present) is caused to precipitate at a catalytic reforming reaction temperature of at least about 800 degrees C., the development of dislocation gliding can be retarded within grains to give a remarkably improved creep rupture strength.

An object of the present invention is to provide a heat resistant alloy adapted to precipitate a fine Ti—Nb—Cr carbide (or Ti—Nb—Zr—Cr carbide when Zr is further present) when heated after casting and thereby given a high creep rupture strength.

Another object of the invention is to provide a heat resistant alloy which is outstanding in thermal conductivity.

Still another object of the invention is to provide a hydrogen production reforming tube which is prepared from a heat resistant alloy adapted to precipitate a fine Ti—Nb—Cr carbide (or Ti—Nb—Zr—Cr carbide when Zr is further present) when heated after casting.

SUMMARY OF THE INVENTION

To fulfill the above objects, the present invention provides a heat resistant alloy comprising, in % by weight, over 0.6% to not more than 0.9% of C, up to 2.5% of Si, up to 3.0% of Mn, 20 to 28% of Cr, 8 to 55% of Ni, 0.01 to 0.8% of Ti and 0.05 to 1.5% of Nb, the balance being Fe and inevitable impurities, the value of (Ti+Nb)/C being 0.12 to 0.29 in atomic % ratio.

The heat resistant alloy of the present invention can further contain up to 0.5% of Zr. In this case, the value of (Ti+Nb+Zr)/C is 0.12 to 0.29 in atomic % ratio.

The heat resistant alloy of the present invention can further contain at least one element selected from the group consisting of up to 3% of W, up to 3% of Mo and up to 0.05% of B.

The heat resistant alloy of the present invention can further contain 0.001 to 0.05% of Mg.

The heat resistant alloy of the present invention can further contain 0.001 to 0.2% of Ce.

BEST MODE OF CARRYING OUT THE INVENTION

Figure 1:
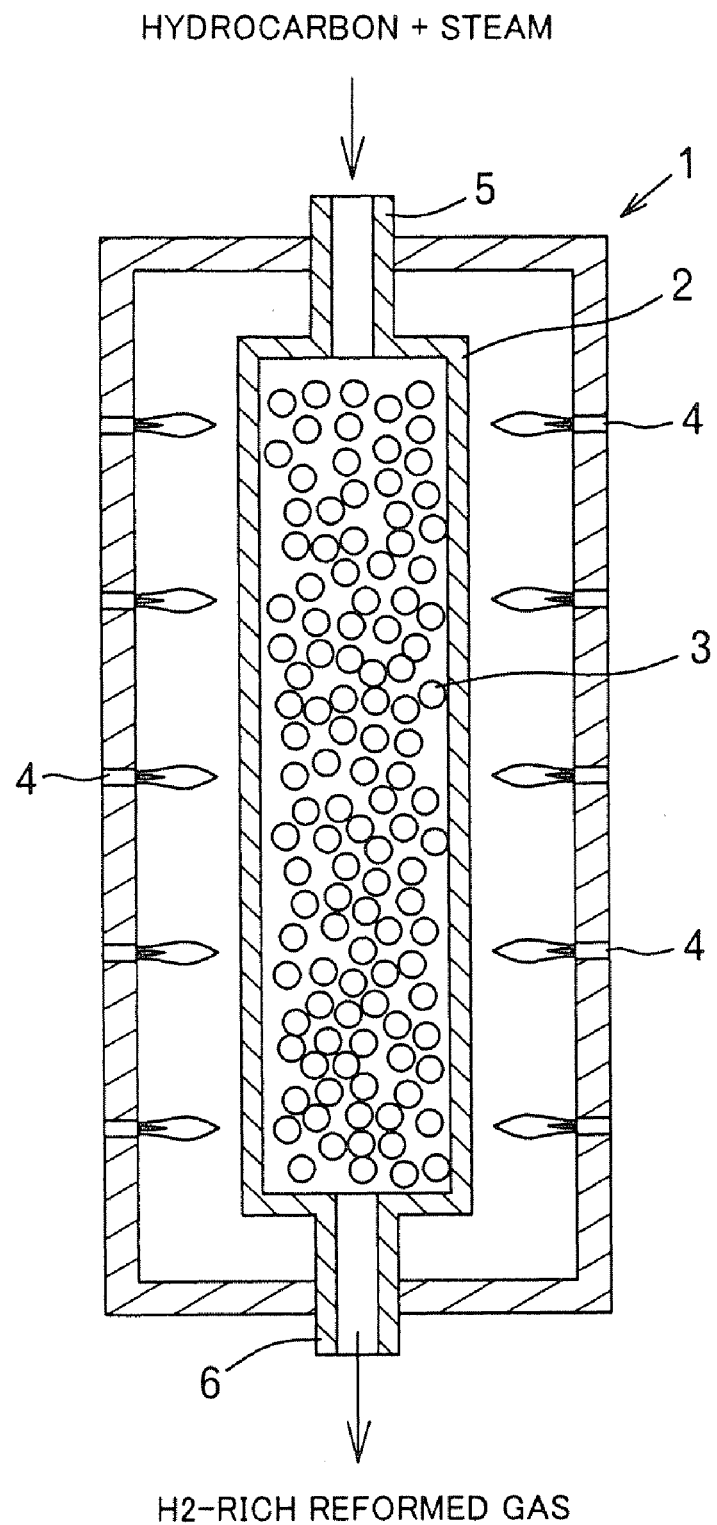
FIG. 1 is a sectional view showing an example of hydrogen production reforming tube in use.

The present invention provides a heat resistant alloy comprising, in % by weight, over 0.6% to not more than 0.9% of C, up to 2.5% of Si, up to 3.0% of Mn, 20 to 28% of Cr, 8 to 55% of Ni, 0.01 to 0.8% of Ti and 0.05 to 1.5% of Nb, the balance being Fe and inevitable impurities, the value of (Ti+Nb)/C being 0.12 to 0.29 in atomic % ratio.

The heat resistant alloy of the present invention further contains up to 0.5% of Zr, and the value of (Ti+Nb+Zr)/C is 0.12 to 0.29 in atomic % ratio.

When desired, the heat resistant alloy of the present invention can further contain at least one element selected from the group consisting of up to 3% of W, up to 3% of Mo and up to 0.05% of B, and contain 0.001 to 0.05% of Mg and 0.001 to 0.2% of Ce.

The greatest feature of the heat resistant alloy of the invention is that the alloy is so defined that the value of (Ti+Nb)/C [or (Ti+Nb+Zr)/C when the alloy contains Zr] is 0.12 to 0.29 in atomic % ratio. (The expression defining the ratio will hereinafter be referred to as the "relational expression.")

The relational expression represents the ratio of the total number of atoms of Ti, Nb and Zr to one atom of carbon. When the heat resistant alloy of the invention is within the range of 0.12 to 0.29 in this atomic ratio and when the alloy is heated at a temperature of at least about 800 degrees C. after casting, a corresponding amount of fine Ti—Nb—Cr carbide or Ti—Nb—Zr—Cr carbide which is up to about 100 nm, preferably about 20 to about 50 nm, in particle size precipitates in the base material of austenite. This fine carbide precipitate serves to prevent the development of dislocation slip that occurs within the grains with creep deformation. This lengthens the time taken for a creep rupture to take place, affording an improved creep rupture strength. The prevention of development of dislocation slip will be described later with reference to Examples.

If the value of the relational expression is less than 0.12, that is, if the total number of atoms of Ti, Nb and Zr is less than 0.12 times the number of atoms of C, the atom number of Ti, Nb and Zr is small relative to the atom number of C, so that the amount of Ti—Nb—Cr carbide or Ti—Nb—Zr—Cr carbide precipitated by secondary heating becomes insufficient, failing to give a satisfactory creep rupture strength. Although an excess of C will precipitate as $Cr_{23}C_6$, it is impossible to expect any remarkable improvement in creep rupture strength only by the precipitation strengthening with this carbide.

If the value of the relational expression is greater than 0.29, that is, if the total number of atoms of Ti, Nb and Zr is greater than 0.29 times the number of atoms of C, the atom number of Ti, Nb and Zr is great relative to the atom number of C, so that a Ti—Nb—Cr carbide or Ti—Nb—Zr—Cr carbide crystallizes out as a primary carbide in the step of casting in an increased amount, decreasing the amount of C to be present in the base material as a solid solution. This results in an insufficient amount of Ti—Nb—Cr carbide or Ti—Nb—Zr—Cr carbide precipitate after the secondary heating.

Given below are the reasons for limiting the components of the heat resistant alloys of the invention.

C: over 0.6% to not more than 0.9%

As previously described, C combines with Cr, Ti, Nb and Zr on solidification of molten steel as cast, crystallizing out at the grain boundaries in the form of Cr carbide ($Cr_7C_3$), Ti—Nb carbide and Ti—Nb—Zr carbide as primary carbides. These carbides strengthen the grain boundaries, acting to give an enhanced creep rupture strength.

When the alloy as cast is heated at a temperature of at least 800 degrees C., carbon in the form of a solid solution in the austenitic base material combines with Cr, Ti, Nb and Zr, forming a fine Ti—Nb—Cr carbide or Ti—Nb—Zr—Cr carbide within the grains as a precipitate of secondary carbide. This gives a remarkably improved creep rupture strength.

The alloy is caused to incorporate therein at least over 0.6% of C so as to form a sufficient amount of carbide for giving the desired creep rupture strength at a high temperature of at least 800 degrees C. If the amount of C is in excess of 0.9%, on the other hand, the alloy as cast exhibits an impaired elongation, so that the upper limit should be 0.9%.

Si: up to 2.5%

Si is an element effective for deoxidizing molten steel and giving flowability to molten steel. Presence of up to 2.5% of Si is sufficient to obtain this effect. If the amount is in excess of 2.5%, an impaired creep rupture strength will result at high temperatures. Preferably, the content is up to 1.0%.

Mn: up to 3.0%

Mn is an element useful for deoxidizing molten steel and fixing S in molten steel (by forming MnS) to thereby give improved weldability and improved ductility. However, presence of an excess of Mn results in an impaired high-temperature creep rupture strength, so that the upper limit should be 3.0%. The Mn content is preferably up to 0.8%.

Cr: 20-28%

Cr is an element necessary for assuring high-temperature strength and oxidation resistance. Cr forms a chromium carbide during casting and when the alloy is heated after casting. At least 20% of Cr needs to be present to ensure a creep rupture strength capable of withstanding services at high temperatures of up to about 1000 degrees C. as required for hydrogen production reforming tubes. The high-temperature strength and oxidation resistance improve with an increase in the amount of Cr, whereas presence of more than 28% of Cr entails a lower high-temperature creep rupture strength although leading to an improved oxidation resistance. For this reason, the upper limit should be 28%. The content is preferably 23 to 27%.

Ni: 8-55%

Ni is an element for ensuring oxidation resistance and stabilization of the metal structure. If less than 8% of Ni is present, it becomes difficult to assure the high-temperature creep rupture strength required of hydrogen production reforming tubes. Thus, at least 8% of Ni should be present. However, even if more than 55% of Ni is present, any increased creep rupture strength is not available, so that the upper limit should be 55%. The preferred Ni content is in the range of 15 to 25%.

Ti: 0.01-0.8%

When the alloy as cast solidifies, Ti combines with C along with Nb and Zr, forming a Ti—Nb carbide and Ti—Nb—Zr carbide as primary carbides crystallizing out at the grain boundaries. These carbides act to strengthen the grain boundaries to give an enhanced creep rupture strength.

When the cast alloy is heated at a temperature of at least 800 degrees C., Ti combines with the C in the form of a solid solution in the base material of austenite, along with Cr, Nb and Zr, forming a fine Ti—Nb—Cr carbide or Ti—Nb—Zr—Cr carbide as a secondary carbide precipitating within the grains. The carbide affords a remarkably improved creep rupture strength.

At least 0.01% of Ti needs to be present to obtain this effect. However, an excess of Ti impairs the clarity of steel with an increase in the amount of titanium oxide formed, entailing a lower quality and a diminished tensile elongation. Accordingly, the upper limit should be 0.8%. The preferred Ti content is 0.15 to 0.5%.

Nb: 0.05-1.5%

Like Ti, Nb forms a Ti—Nb carbide and Ti—Nb—Zr carbide as primary carbides crystallizing out at the grain boundaries when the alloy is cast, giving a higher creep rupture strength and contributing to an improvement in aging ductility. When the alloy is heated at a high temperature of at least 800° C., Ti—Nb—Cr carbide and Ti—Nb—Zr—Cr carbide are precipitated in the base material of austenite.

These effects are available if at least 0.05% of Nb is present. An excess of Nb nevertheless leads to lower oxidation resistance, so that the upper limit should be 1.5%. The Nb content is preferably in the range of 0.4 to 1.0%.

The heat resistant alloy of the invention contains the foregoing components, and the balance comprises Fe and inevitable impurities, whereas up to 0.5% of Zr can be present when so desired. At least one element selected from the group consisting of up to 3% of W, up to 3% of Mo and up to 0.05% of B can further be present. Furthermore, 0.001 to 0.05% of Mg can be present. Furthermore, 0.001 to 0.2% of Ce can be present.

Zr: up to 0.5%

In the presence of both Ti and Nb, Zr forms a Ti—Nb—Zr carbide during casting as a primary carbide crystallizing out at the grain boundaries, giving an enhanced creep rupture strength and contributing to an improvement in aging ductility. Further when the alloy is heated at a high temperature of at least 800 degrees C., Zr forms a Ti—Nb—Zr—Cr carbide crystallizing out in the base material of austenite. However, if more than 0.5% of Zr is present, Zr oxide will be formed in an increased amount to entail lower index of cleanliness of steel, consequently leading to a lower ductility. The upper limit is therefore 0.5%.

W: up to 3%

W contributes to an improvement in creep rupture strength and is therefore preferable to add. However, when the W content is in excess of 3%, the alloy as cast exhibits a markedly reduced elongation. The upper limit should therefore be 3%.

Mo: up to 3%

Mo contributes to an improvement in creep rupture strength and is therefore preferable to add. However, when the Mo content is in excess of 3%, the alloy as cast exhibits a markedly reduced elongation. The upper limit should therefore be 3%

B: up to 0.05%

B contributes to an improvement in creep rupture strength and is therefore preferable to add. However, when the B content is in excess of 0.05%, the alloy becomes more susceptible to weld cracking. The upper limit should therefore be 0.05%.

Mg: 0.001-0.05%

We have found that Mg dissolves into the base material, producing an effect to give improved thermal conductivity. Accordingly, when the heat resistant alloy contains Mg and is used for hydrogen production reforming tubes, an improved heat transfer efficiency reduces the amount of fuel to be used to lower the running cost. The reduction in the amount of fuel leads to diminished $CO_2$ emission and is therefore environmentally desirable. It is desirable that at least 0.001% of Mg be present. However, over 0.05% of Mg, if present, entails a lower creep rupture strength. The upper limit should accordingly be 0.05%. The preferred Mg content is 0.001 to 0.015%.

Ce: 0.001-0.2%

Since Ce forms a solid solution with the matrix, contributing to an improvement in high-temperature oxidation resistance, it is desirable that at least 0.001% of Ce be present. The presence of more than 0.2% of Ce nevertheless forms an increased amount of Ce oxide to result in impaired clarity and a lower quality. The upper limit is therefore 0.2%.

The heat resistant alloy of the present invention can be made into hydrogen production reforming tubes by centrifugal casting. The cast tubes obtained are finished by machining and thereafter assembled into a hydrogen production apparatus by welding.

FIG. 1 shows an example of reforming tube 2 assembled into a reforming furnace 1 of the hydrogen production apparatus. The reforming tube 2 is a tubular assembly (comprising tubes having a length of about 5 m and joined together by welding) which is, for example, about 100 to about 230 mm in outside diameter, about 8 to about 20 mm in wall thickness and about 10 to about 13 m in length. The tube 2 is filled with a catalyst 3. The number of tubular assemblies of reforming tubes to be arranged within the furnace are about 50 to about 200 although dependent on the scale of the hydrogen production plant. The reforming tubes are heated at a reforming reaction temperature of about 800 to about 1000 degrees C. by burners 4 provided on the furnace wall. A material gas in the form of a mixture of hydrocarbon and steam is supplied to the furnace through an inlet 5 at a pressure of about 10 to about 30 $kgf/cm^2$, subjected to a reforming reaction while flowing through the tube and made into a hydrogen-rich reformed gas. The reformed gas flows out through an outlet 6 and is collected in a manifold.

EXAMPLES

Preparation of Specimens

Molten steels to be cast and each having the composition listed in Table 1 were prepared by atmospheric melting in a high-frequency induction melting furnace and made into specimen tubes by centrifugal mold casting. The specimen tubes obtained were 137 mm in outside diameter, 20 mm in wall thickness and 260 mm in length. Test pieces were cut out from the specimen tubes and subjected to a creep rupture test, thermal conductivity measurement and oxidation resistance test. With reference to Table 1, No. 1 to No. 18 are examples of the invention and No. 101 to No. 111 are comparative examples.

The atomic % ratios listed in Table 1 and defined by the relational expression (Ti+Nb+Zr)/C were calculated using the atomic weights of: C=12, Nb=93, Ti=48 and Zr=91.

[Creep Rupture Test]

Conducted according to JIS-Z2272. Each of the test pieces (6 mm in parallel portion diameter and 30 mm in gauge length) prepared from the respective specimen tubes was heated at 1050 degrees C. and subjected to a creep rupture test at a tensile stress of 24.5 MPa to measure the period of time (hr) resulting in a rupture. Table 1 shows the test results.

[Measurement of Thermal Conductivity]

The thermal conductivity was measured at 1000 degrees C. by the laser flash method. Table 1 shows the results of measurement.

TABLE 1

| | Alloy Components (weight %) Balance Fe and inevitable impurities | | | | | | | | | | | | | (Ti + Nb + Zr)/C Atomic % ratio | Creep rupture time (Hrs) | Thermal conductivity (cal/sec - ° C.) |
|---|---|---|---|---|---|---|---|---|---|---|---|---|---|---|---|---|
| No. | C | Si | Mn | Cr | Ni | Ti | Nb | Zr | W | Mo | B | Mg | Ce | | | |
| 1 | 0.73 | 0.48 | 0.45 | 24.1 | 17.7 | 0.12 | 0.43 | — | — | — | — | — | — | 0.12 | 704 | 0.066 |
| 2 | 0.68 | 0.45 | 0.43 | 24.1 | 16.5 | 0.18 | 0.51 | — | — | — | — | — | — | 0.16 | 733 | 0.065 |
| 3 | 0.68 | 0.52 | 0.47 | 25.1 | 17.5 | 0.40 | 0.71 | — | — | — | — | — | — | 0.28 | 828 | 0.067 |
| 4 | 0.75 | 0.47 | 0.50 | 24.5 | 17.9 | 0.13 | 0.36 | 0.08 | — | — | — | — | — | 0.12 | 764 | 0.064 |
| 5 | 0.67 | 0.43 | 0.47 | 24.2 | 17.1 | 0.33 | 0.73 | 0.15 | — | — | — | — | — | 0.29 | 840 | 0.066 |
| 6 | 0.70 | 0.47 | 0.51 | 24.8 | 16.8 | 0.22 | 0.48 | 0.23 | 1.25 | — | — | — | — | 0.21 | 775 | 0.066 |
| 7 | 0.69 | 0.53 | 0.52 | 24.4 | 17.5 | 0.16 | 0.53 | 0.19 | — | 0.68 | — | — | — | 0.19 | 697 | 0.067 |

TABLE 1-continued

| | Alloy Components (weight %) Balance Fe and inevitable impurities | | | | | | | | | | | | | (Ti + Nb + Zr)/C Atomic % ratio | Creep rupture time (Hrs) | Thermal conductivity (cal/sec - °C.) |
|---|---|---|---|---|---|---|---|---|---|---|---|---|---|---|---|---|
| No. | C | Si | Mn | Cr | Ni | Ti | Nb | Zr | W | Mo | B | Mg | Ce | | | |
| 8 | 0.72 | 0.55 | 0.43 | 24.5 | 17.6 | 0.23 | 0.51 | 0.22 | — | — | 0.011 | — | — | 0.21 | 713 | 0.065 |
| 9 | 0.73 | 0.45 | 0.47 | 24.2 | 17.2 | 0.19 | 0.55 | — | 1.74 | 1.37 | — | — | — | 0.16 | 842 | 0.067 |
| 10 | 0.70 | 0.41 | 0.40 | 24.3 | 18.0 | 0.22 | 0.47 | — | — | 1.45 | 0.009 | — | — | 0.17 | 733 | 0.067 |
| 11 | 0.73 | 0.47 | 0.49 | 24.9 | 18.4 | 0.25 | 0.57 | — | 0.96 | 1.30 | 0.010 | — | — | 0.19 | 885 | 0.066 |
| 12 | 0.61 | 0.43 | 0.67 | 24.8 | 15.5 | 0.30 | 0.52 | — | — | — | — | 0.007 | — | 0.23 | 515 | 0.076 |
| 13 | 0.62 | 0.51 | 0.68 | 24.7 | 23.8 | 0.24 | 0.52 | 0.22 | — | — | — | 0.012 | — | 0.25 | 627 | 0.080 |
| 14 | 0.68 | 0.42 | 0.55 | 24.8 | 16.7 | 0.28 | 0.49 | 0.20 | — | 2.53 | — | 0.011 | — | 0.24 | 636 | 0.079 |
| 15 | 0.69 | 0.42 | 0.49 | 24.6 | 16.9 | 0.23 | 0.66 | — | — | — | — | 0.010 | 0.09 | 0.21 | 770 | 0.080 |
| 16 | 0.67 | 0.48 | 0.54 | 24.7 | 18.6 | 0.27 | 0.47 | — | — | — | — | 0.009 | 0.04 | 0.19 | 782 | 0.077 |
| 17 | 0.66 | 0.53 | 0.49 | 25.3 | 18.6 | 0.21 | 0.52 | 0.14 | 1.70 | — | 0.014 | 0.010 | 0.16 | 0.21 | 683 | 0.080 |
| 18 | 0.68 | 0.44 | 0.46 | 25.4 | 17.7 | 0.18 | 0.51 | 0.19 | 2.21 | 1.81 | 0.016 | 0.012 | — | 0.20 | 714 | 0.081 |
| 101 | 0.64 | 0.34 | 0.51 | 25.4 | 17.1 | 0.02 | 0.35 | — | — | — | — | — | — | 0.07 | 239 | 0.066 |
| 102 | 0.66 | 0.44 | 0.53 | 25.2 | 17.5 | 0.19 | 1.36 | — | — | — | — | — | — | 0.34 | 384 | 0.065 |
| 103 | 0.96 | 0.66 | 0.70 | 24.8 | 18.2 | 0.11 | 0.45 | — | — | — | — | — | — | 0.09 | 302 | 0.065 |
| 104 | 0.40 | 0.68 | 0.67 | 25.6 | 18.5 | 0.22 | 0.60 | — | — | — | — | — | — | 0.33 | 205 | 0.067 |
| 105 | 0.50 | 0.57 | 0.58 | 25.1 | 17.5 | 0.07 | 0.11 | 0.07 | — | — | — | — | — | 0.08 | 189 | 0.066 |
| 106 | 0.42 | 0.60 | 0.66 | 24.6 | 17.9 | 0.18 | 0.51 | 0.22 | — | — | — | — | — | 0.33 | 260 | 0.065 |
| 107 | 0.44 | 0.41 | 0.75 | 23.7 | 15.3 | 0.33 | 1.51 | 0.25 | — | — | — | <0.001 | — | 0.41 | 227 | 0.067 |
| 108 | 0.40 | 0.49 | 0.65 | 25.3 | 17.1 | 0.20 | 0.62 | 0.24 | — | — | — | 0.06 | — | 0.40 | 143 | 0.089 |
| 109 | 0.38 | 0.44 | 0.59 | 25.1 | 17.6 | 0.22 | 0.47 | 0.20 | 0.95 | 1.32 | — | 0.01 | 0.23 | 0.37 | 221 | 0.081 |
| 110 | 0.39 | 0.63 | 0.67 | 25.6 | 17.8 | 0.06 | 0.11 | 0.05 | 1.03 | — | 0.018 | 0.009 | 0.14 | 0.09 | 166 | 0.080 |
| 111 | 0.38 | 0.65 | 0.70 | 25.4 | 17.9 | 0.15 | 0.49 | 0.17 | — | 1.14 | 0.013 | 0.01 | 0.13 | 0.32 | 239 | 0.080 |

Figure 2:
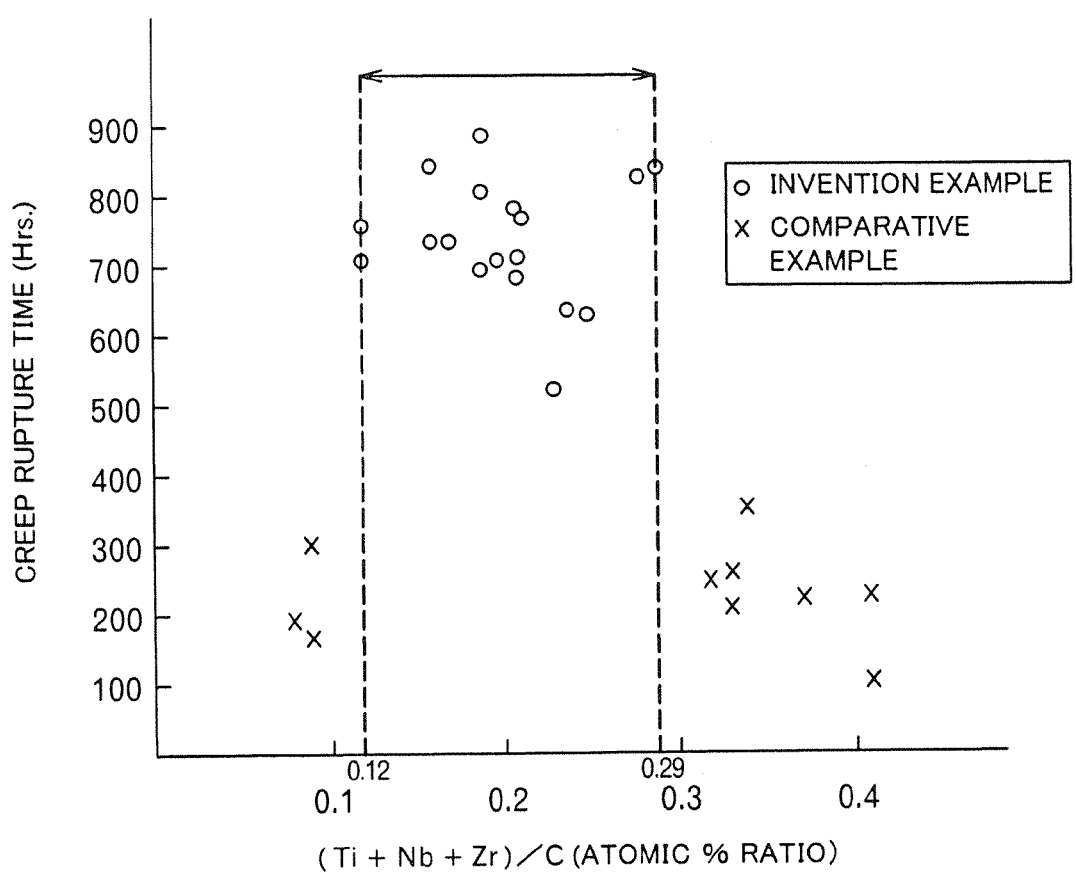
FIG. 2 is a graph showing the test results of creep rupture time listed in Table 1.

Table 1 shows that the Examples of the invention No. 1 to No. 18 which are in the range of 0.12 to 0.29 in the atomic % ratio of (Ti+Nb+Zr)/C are longer in the period of time taken for a creep rupture than the Comparative Examples which are outside this range in the ratio. This indicates that the Invention Examples are superior in creep rupture strength. FIG. 2 is a graph showing the results of Table 1 as plotted thereon. FIG. 2 reveals that at least 0.12 and 0.29 are critical points.

With reference to Table 1 again, Invention Examples No. 12 to No. 18 which contain Mg are greater in thermal conductivity than No. 1 to No. 11 which does not contain Mg. This indicates that the presence of Mg is effective for giving improved thermal conductivity.

Figure 3:
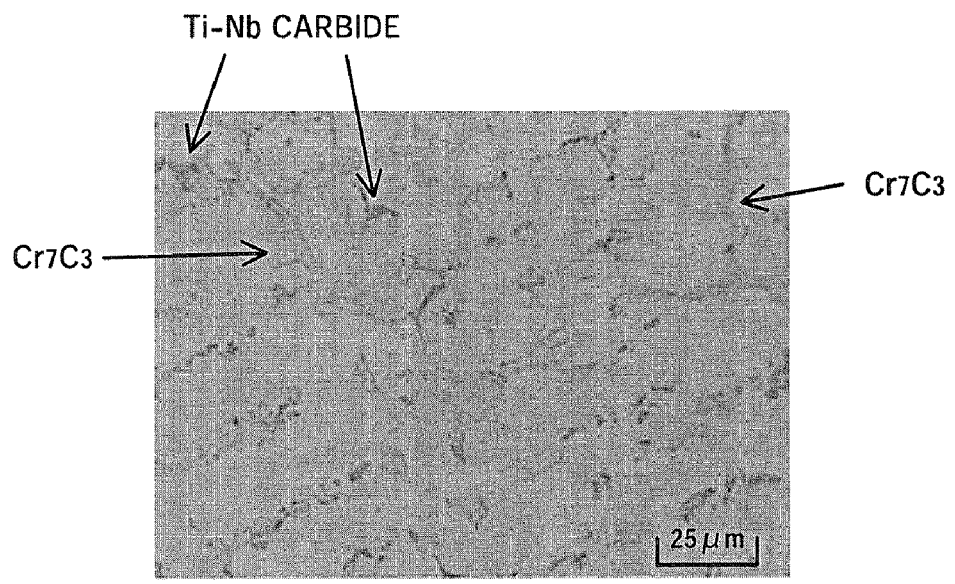
FIG. 3 is an optical photomicrograph (×400) showing the metal structure (as cast) of a test piece cut out from the specimen tube of Example No. 3.

A test piece (10 mm×10 mm×10 mm) was cut out from the specimen tube of Invention Example No. 3, and the structure of the metal as cast was observed under an optical microscope. FIG. 3 shows a photomicrograph (×400) of the metal structure. With reference to FIG. 3, C combines with Cr, causing a Cr carbide, i.e., $Cr_7C_3$, to crystallize out, and also combines with Ti and Nb, causing a Ti—Nb carbide (appearing dark) to crystallize out. These primary carbides appear at grain boundaries.

Figure 4:
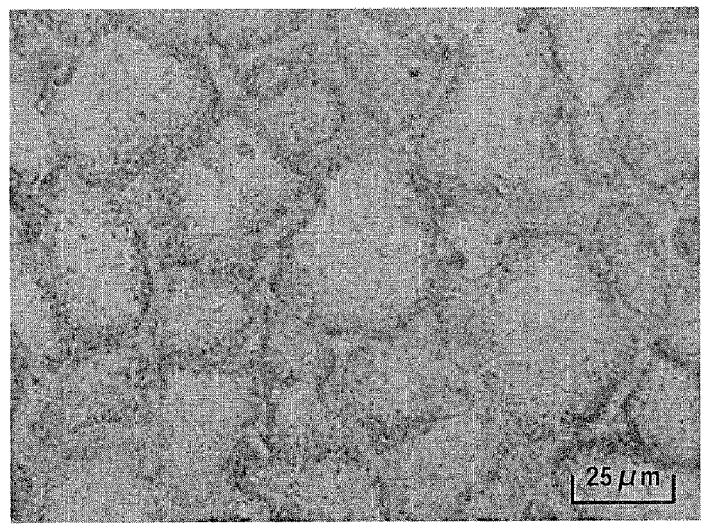
FIG. 4 is an optical photomicrograph (×400) showing the metal structure of the test piece of FIG. 3 after it has been heated at 1050 degrees C. and subjected to a tensile stress of 24.5 MPa for 100 hours.

Next, a test piece (6 mm in parallel portion diameter and 30 mm in gauge length) for creep test was prepared from Invention Example No. 3, then heated at 1050 degrees C., subjected to a tensile stress of 24.5 MPa for 100 hours and thereafter checked for its metal structure under an optical microscope and also a transmission electron microscope (TEM). FIG. 4 shows an optical photomicrograph of the structure at the same magnification as FIG. 3, and FIGS. 5 to 7 are TEM photographs of the structure taken at different magnifications.

FIG. 4 reveals many dark dot patterns around grain boundaries which represent a precipitate of secondary carbide $Cr_{23}C_6$. The secondary carbide has an effect for strengthening the grain boundaries to retard the development of cracks.

Figure 5:
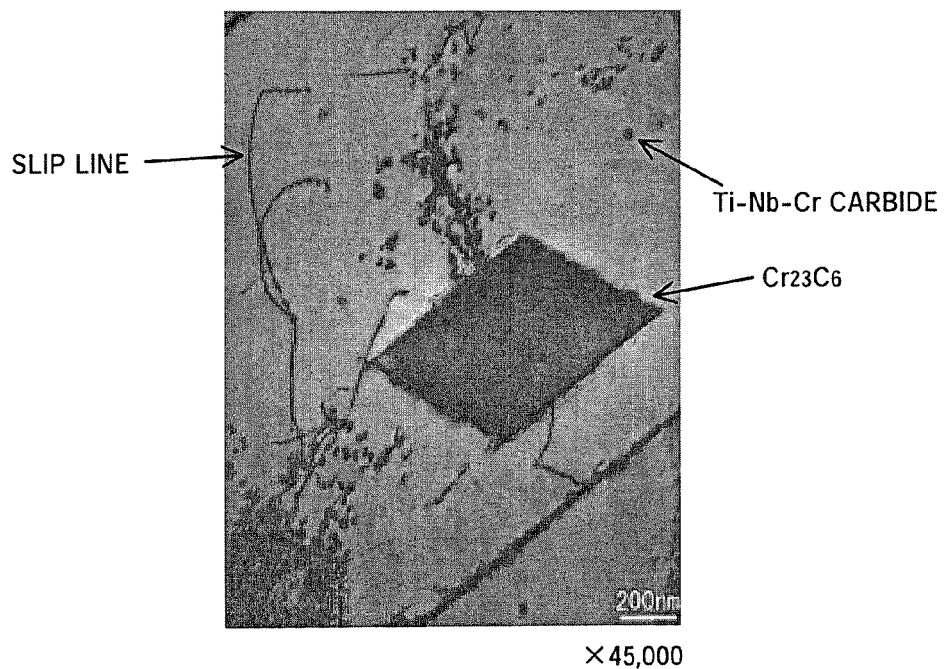
FIG. 5 is a TEM photograph (×45000) of the metal structure of FIG. 4.
Figure 8:
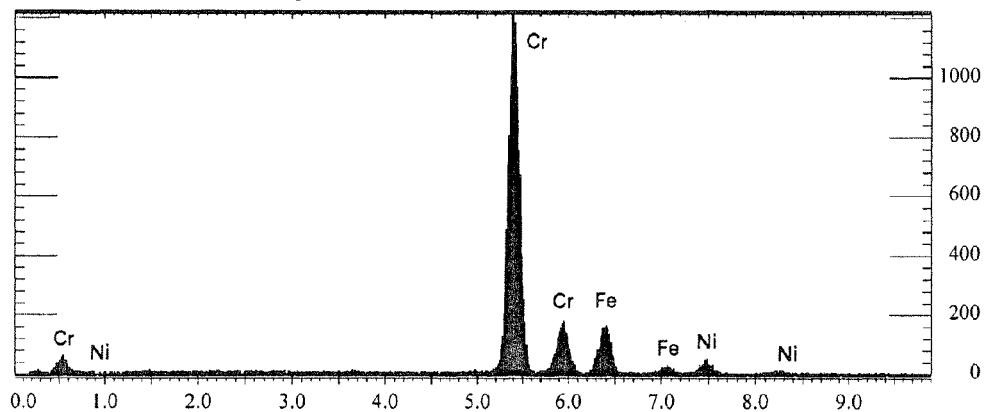
FIG. 8 shows the result of fluorescent X-ray spectroscopy of $Cr_{23}C_6$.

FIG. 5 is a TEM photograph taken at a magnification of ×45000 and showing precipitates of a secondary carbide, i.e., $Cr_{23}C_6$, and Ti—Nb—Cr carbide, and a slip line produced by dislocation due to creep deformation. The $Cr_{23}C_6$ precipitate is in the form of a rectangle having a diagonal line of about 1 μm in length, and was identified with reference to the result of fluorescent X-ray spectroscopy shown in FIG. 8.

Figure 6:
FIG. 6 is a TEM photograph (×90000) of the metal structure of FIG. 4.
Figure 7:
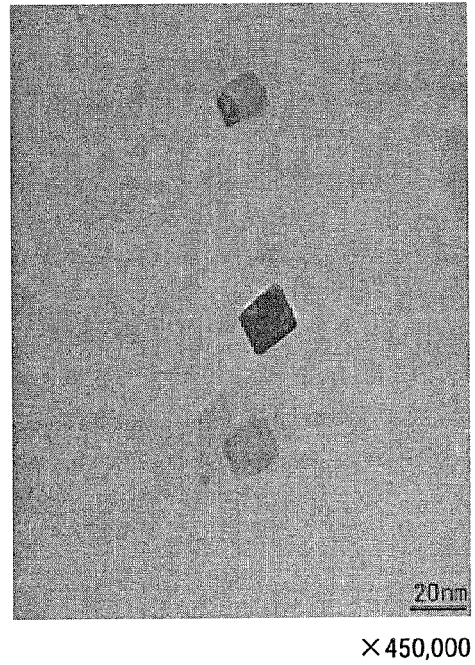
FIG. 7 is a TEM photograph (×450000) of the metal structure of FIG. 4.
Figure 9:
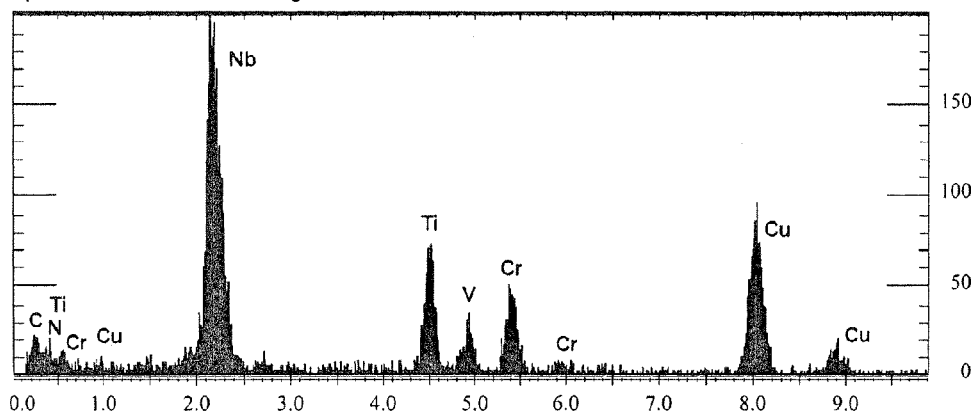
FIG. 9 shows the result of fluorescent X-ray spectroscopy of a Ti—Nb—Cr carbide.

FIG. 6 is a TEM photograph taken at a magnification of ×90000 and showing the Ti—Nb—Cr carbide and slip lines. FIG. 7 is a TEM photograph taken at a magnification of ×450000 and revealing the Ti—Nb—Cr carbide only as enlarged. The TI—Nb—Cr carbide is in the form of a rectangle with a diagonal of about 20 nm in length and was identified with reference to the result of fluorescent X-ray spectroscopy shown in FIG. 9.

FIG. 6 shows that the slip line is prevented from developing by many blocks of Ti—Nb—Cr carbide precipitate, revealing the suppression of intragranular gliding. As the amount of Ti—Nb—Cr carbide precipitate increases, the intragranular gliding retarding effect becomes greater, lengthening the time taken for the occurrence of a creep rupture.

Furthermore, test pieces (10 mm×10 mm×10 mm) were cut out from the specimen tubes of Examples No. 1, No. 5, No. 12, No. 101, No. 102, No. 103 and No. 104, then heated at 1000 degrees C. for 200 hours and thereafter checked for the metal structures under a TEM. No. 1 and No. 12 were found to contain a considerable amount of Ti—Nb—Cr carbide precipitate, while No. 5 contained Ti—Nb—Zr—Cr carbide precipitate in a considerable amount. However, the test pieces of No. 101 to No. 104 were diminished in the Ti—Nb—Cr carbide precipitate. Like Ti—Nb—Cr carbide, the Ti—Nb—Zr—Cr carbide was identified by fluorescent X-ray spectroscopy.

[Oxidation Resistance Test]

No. 13 and No. 15 were tested for oxidation resistance. Three test pieces (8 mm in diameter and 30 mm in length) were cut out from each of the test specimens, then held at 1000 degrees C. in a heating furnace (open-air atmosphere) for 100 hours, then withdrawn from the furnace, treated with an acid solution for descaling the surfaces and checked for the variation in the weight of the test piece due to descaling to calculate the oxidation loss and the oxidation loss per hour.

The average value of the three test pieces was 0.030 (mg/$cm^2$h) for No. 13, or 0.025 (mg/$cm^2$h) for No. 15. No. 15 containing Ce was lesser in oxidation loss than No. 13 which is free from Ce. This reveals that the presence of Ce is effective for giving improved oxidation resistance.

Advantages of the Invention

When used for operation at 800 to 1000 degrees C., the hydrogen production reforming tubes made from the heat resistant alloy of the invention precipitates fine Ti—Nb—Cr carbide or Ti—Nb—Zr—Cr carbide which is up to about 100 nm in particle size. The fine carbide greatly contributes to an improvement in creep rupture strength.

The heat resistant alloy of the invention exhibits outstanding thermal conductivity when incorporating a specified amount of Mg.

INDUSTRIAL APPLICABILITY

When the heat resistant alloy of the invention is used at a temperature of at least 800 degrees C., a fine Ti—Nb—Cr carbide or Ti—Nb—Zr—Cr carbide precipitates which is up to about 100 nm in particle size, affording a high creep rupture resistance. The alloy is therefore suited as a material for hydrogen production reforming tubes for use at about 800 degrees C. to about 1000 degrees C., giving an increased service life to the tube or reducing the wall thickness of the tube to achieve an improved heat efficiency. The presence of Mg affords outstanding thermal conductivity to attain an improved heat efficiency.

The invention claimed is:

1. A heat resistant alloy comprising, in % by weight, over 0.6% to not more than 0.9% of C, up to 2.5% of Si, up to 3.0% of Mn, 20 to 28% of Cr, 8 to 55% of Ni, 0.01 to 0.8% of Ti and 0.05 to 1.5% of Nb, the balance being Fe and inevitable impurities, the value of (Ti+Nb)/C being 0.12 to 0.29 in atomic % ratio,
    wherein a fine Ti—Nb—Cr carbide with a particle size of up to about 100 nm precipitates when said heat resistant alloy is heated at a temperature of at least 800° C.

2. The heat resistant alloy according to claim 1 which further contains up to 0.5% of Zr, the value of (Ti+Nb+Zr)/C being 0.12 to 0.29 in atomic % ratio,
    wherein a fine Ti—Nb—Zr—Cr carbide with a particle size of up to about 100 nm precipitates when said heat resistant alloy is heated at a temperature of at least 800° C.

3. The heat resistant alloy according to claim 1 which further contains at least one element selected from the group consisting of up to 3% of W, up to 3% of Mo and up to 0.05% of B.

4. The heat resistant alloy according to claim 2 which further contains at least one element selected from the group consisting of up to 3% of W, up to 3% of Mo and up to 0.05% of B.

5. The heat resistant alloy according to claim 1 which contains 0.001 to 0.05% of Mg.

6. The heat resistant alloy according to claim 2 which contains 0.001 to 0.05% of Mg.

7. The heat resistant alloy according to claim 3 which contains 0.001 to 0.05% of Mg.

8. The heat resistant alloy according to claim 4 which contains 0.001 to 0.05% of Mg.

9. The heat resistant alloy according to claim 1 which contains 0.001 to 0.2% of Ce.

10. The heat resistant alloy according to claim 2 which contains 0.001 to 0.2% of Ce.

11. The heat resistant alloy according to claim 3 which contains 0.001 to 0.2% of Ce.

12. The heat resistant alloy according to claim 4 which contains 0.001 to 0.2% of Ce.

13. The heat resistant alloy according to claim 8 which contains 0.001 to 0.2% of Ce.

14. A reforming tube for producing hydrogen which is made from a heat resistant alloy according to claim 1.

15. A reforming tube for producing hydrogen which is made from a heat resistant alloy according to claim 2.

16. A reforming tube for producing hydrogen which is made from a heat resistant alloy according to claim 3.

17. A reforming tube for producing hydrogen which is made from a heat resistant alloy according to claim 4.

18. A reforming tube for producing hydrogen which is made from a heat resistant alloy according to claim 5.

19. A reforming tube for producing hydrogen which is made from a heat resistant alloy according to claim 6.

20. A reforming tube for producing hydrogen which is made from a heat resistant alloy according to claim 7.

21. A reforming tube for producing hydrogen which is made from a heat resistant alloy according to claim 8.

22. A reforming tube for producing hydrogen which is made from a heat resistant alloy according to claim 9.

23. A reforming tube for producing hydrogen which is made from a heat resistant alloy according to claim 10.

24. A reforming tube for producing hydrogen which is made from a heat resistant alloy according to claim 11.

25. A reforming tube for producing hydrogen which is made from a heat resistant alloy according to claim 12.

26. A reforming tube for producing hydrogen which is made from a heat resistant alloy according to claim 13.

* * * * *